Aug. 16, 1927.
R. STRESAU
1,638,892
METHOD OF ARC WELDING
Filed Dec. 8, 1922
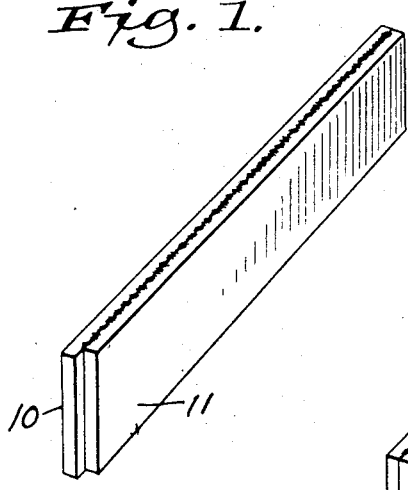
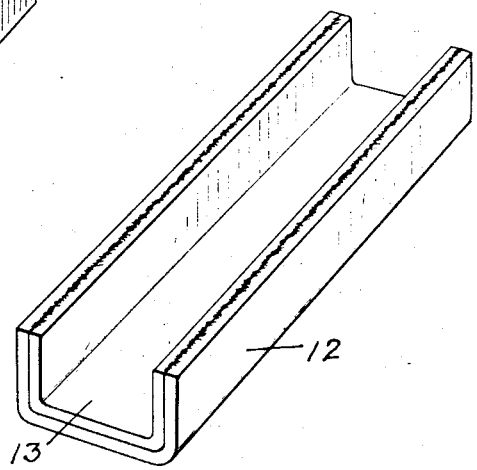
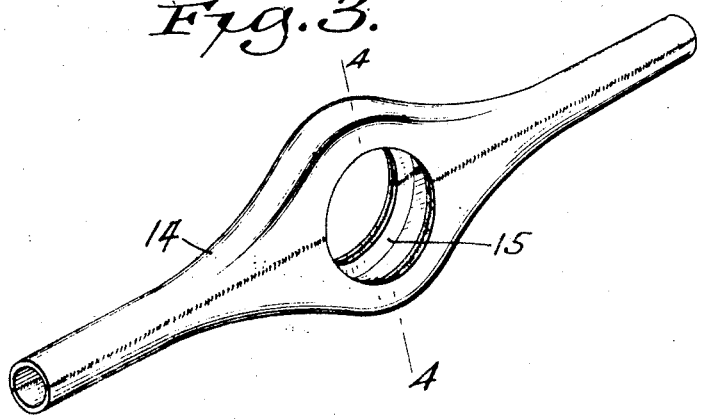
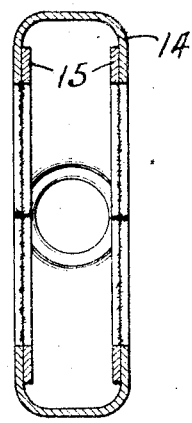
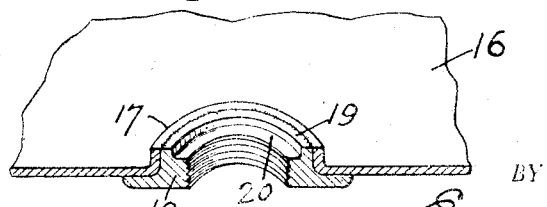
INVENTOR:
Richard Stresau, Patented Aug. 16, 1927.

1,638,892

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

METHOD OF ARC WELDING.

Application filed December 8, 1922. Serial No. 605,590.

My present invention relates to a new and improved method of electric arc welding, which I shall denominate as edge welding, in contradistinction to the recognized methods of "butt" welding, "lap" welding and "spot" welding, now commonly used in uniting metal plates.

It has been found in certain classes of work in which flat metal plates are required to be superposed with their flat sides in contact, that such plates may be effectively joined together by welding along the edges thereof. In certain specific constructions, it is very advantageous to employ this method of electric welding to effect union of the parts. When the metal plates incorporated in such work, or the edges constituting the welding surface have the same gauge, the same thermal conditions are present in both plates, so that the welding may be evenly and uniformly effected, by reason of the fact that the juxtaposed edges of the superposed plates will be fused to an equal degree in the welding operation.

My invention, which comprises the operations of producing the results desired, as well as articles produced in the practice of my method of welding, will now be specifically described, and the novelty thereof pointed out in the appended claim.

In the accompanying drawing,

Figure 1 is a perspective view showing the application of my new method of welding to the edges of superposed plates of uniform gauge.

Fig. 2 is a like view showing how a channel bar may be reinforced in the same manner.

Fig. 3 is a perspective view of a rear axle housing for an automobile, in which the gear openings are reinforced by rings having an internal diameter co-inciding with the diameter of the openings in the housings.

Fig. 4 is an enlarged vertical section on the line 4—4, Fig. 3, showing more clearly the application of my improved method to the production of the axle housing.

Fig. 5 is a vertical sectional view, it may be of the bung of a barrel, showing how the sput is welded in position to the sheet by the practice of my method.

The invention contemplates in the manufacture of certain articles, the welding of a plurality of metal plates or other parts superposed or having their sides in lateral engagement, in which the parts involved in the welding operation are of the same gauge, so that identical thermal conditions will exist in all of the parts to be welded. This fundamental condition is necessary, in order that the heat generated by the welding arc may affect the parts equally and effect their fusion in the same degree in the welding operation, so as to produce a perfectly welded joint.

The arrangements illustrated in the drawing have been selected as convenient examples of constructions embodying my invention, and to which my improved method may be applied, but it will be understood that such method may be employed in connection with the production of generally similar articles other than those which are shown.

Fig. 1 illustrates the method in the simplest form of its application. In this figure, two metal plates 10 and 11 are superposed with their flat sides in close or lateral engagement, and with the edges to be welded in alignment or register, so as to present a plane surface which may be subjected to welding, either by traversing the work with respect to the point of the current conducting weldrod or vice versa, as may be expedient. The edges of the plates 10 and 11, being of uniform gauge, or substantially so, are fused in an equal degree to constitute a perfectly welded line at the point of their union, so that the two plates are joined as in integral structure. The metal flowing from the fusible weldrod, when one of that type is employed, is incorporated in the joint.

Fig. 2 represents the application of the process to the reinforcement of a flanged or channeled bar. It is desirable to reinforce the channeled bars of an automobile frame, or other structure, at certain points by the addition of a plate, in order to create a reinforcement which will permit the secure attachment of adjunctive parts to a frame light in weight. Usually, this reinforcement is effected by riveting a supplementary plate in position, but there exists an objection to this practice in that the several rivet holes in the channeled bar, by means of which the reinforcement is secured to the bar, serve to weaken the latter to an uncertain degree. The flanged bar to be reinforced is indicated by the numeral 12, and the reinforcing plate by the numeral 13, such reinforcing plate being drawn into the form of a channel and having such exterior dimensions as will enable it to fit snugly within the channel of the first mentioned bar, with the flanged edges of both parts standing flush, as in Fig. 2, so as to present an aligned welding surface composed of two edges, as in Fig. 1. The edges are welded at both sides of the bar as before, and thus the bar is endowed with greater strength by reason of reduction in the number of perforations previously required.

My invention has been applied also to pressed steel automobile axle housings 14, of common type, and as shown in Figs. 3 and 4. On their opposite sides such housings are provided with through openings to permit assembling of the gears, and in order to secure the housings in position and support the elements assembled therein, and afford means for attaching the cap to close the outer opening, it is necessary to reinforce the metal about the openings by means of rings 15, placed interiorly thereof. The openings in the housing and the rings being of uniform diameter, the edges thereof are brought into register in the manner shown, so as to present an even surface in the form of an arcuate plane which constitutes the curved welding line, the edges being welded as before indicated. In the welding operation, the housing may be rotated so that the curved welding line will move past the point of the weldrod, or the latter may be rotated so as to traverse the welding line.

In the foregoing examples the two metals to be welded are of the same gauge, or substantially so for the purposes of the invention, no special preparation of either part being necessary in order to adapt my invention thereto.

In Fig. 5 I have shown my invention as applied to the practice of welding sputs in position to constitute the bung hole or other opening of a barrel. In this figure, the numeral 16 indicates a portion of the sheet from which the barrel is formed, the opening therein being provided with an upstanding ring 17, formed integrally of the sheet. The sput 18 is a forging or stamping, as usual, and is specially constructed so as to be adapted for use in connection with my present invention by the formation of an upstanding annular rib 19 on the outer face 20 thereof, which rib 19 has a radial thickness substantially equal to the gauge of the metal from which the ring 17 is formed, and of a height axially which is proportionate to the depth to which the fusion is desired. In inserting the sput in the opening with the flange 21 bearing upon the lower face of the sheet 16, the exposed faces of the annular parts 17 and 19 are brought flush so as to form a curved welding line extending in a flat plane. By the application of the electric arc, the upstanding, laterally engaging parts 17 and 19 are fused so as to be completely welded, and thus unite the sput in its proper position as a permanent part of the barrel construction, the welded area comprising the rib of the sput and the contiguous part of the sheet embodied in the ring.

Although I have described the construction shown in Fig. 5 as particularly applicable for use in the production of barrels, it is obvious that this form of the invention may be employed in the production of tanks or other containers or similar structures. An advantage residing in the present method of welding is that in the formation of the opening in the sheet of a container, the upstanding ring formed integrally with the sheet, serves as a reinforcement and prevents warping of the thin sheet during the welding operation, and consequently when the sput is assembled in the opening preparatory to welding, the proper alignment of the edges is assured. As a preliminary, the edges may be tacked together by spot welding.

The invention is applicable generally to constructions in which metal plates or other elements are superposed or arranged with their wider flat surfaces in lateral engagement with each other, and presenting projecting margins or portions having substantially the same gauge which constitute the area in which the welding is to be effected, and which margins or portions are fused together by an electric arc in an even and uniform manner to produce an integral structure. This result is due to the fact that the edges constituting the welding surface and embodying the area of the weld present in all cases substantially the same thermal conditions, and are therefore equally affected by the temperature of the electric arc.

Although I have described the use of the electric arc as a means for fusing the aligned edges of the parts to be welded, it will be understood that other means, such as gas for instance, may be employed with satisfactory results. I consider all of these methods as equivalent and as within the scope of my invention.

Having thus described my invention, what I claim and desire to secure by Letters Patent of the United States, is:

The method of attaching sputs in position which consists in providing an opening in a metal sheet with an upstanding ring, forming a sput with an annular rib on the face thereof, said ring and rib having substantially the same gauge to present equal thermal conditions, arranging the sput in the opening with the edges of the ring and rib aligned to form a welding surface, and fusing the ring and rib by means of an electric arc to unite the parts into an integral structure.

In testimony whereof, I have signed my name at Milwaukee, this 4th day of December, 1922.

R. STRESAU.